(12) United States Patent
Charrat

(10) Patent No.: US 8,401,474 B2
(45) Date of Patent: Mar. 19, 2013

(54) METHOD AND DEVICE FOR MANAGING APPLICATION DATA IN AN NFC SYSTEM

(75) Inventor: Bruno Charrat, Aix-en-Provence (FR)

(73) Assignee: Inside Secure, Aix-en-Provence Cedex (FR)

( * ) Notice: Subject to any disclaimer, the term of this patent is extended or adjusted under 35 U.S.C. 154(b) by 425 days.

(21) Appl. No.: 12/732,352

(22) Filed: Mar. 26, 2010

(65) Prior Publication Data

US 2010/0178868 A1    Jul. 15, 2010

Related U.S. Application Data

(63) Continuation of application No. PCT/FR2008/001351, filed on Sep. 29, 2008.

(30) Foreign Application Priority Data

Sep. 27, 2007 (FR) .................................... 07 06778
Sep. 27, 2007 (FR) .................................... 07 06779

(51) Int. Cl.
*H04B 7/00* (2006.01)
(52) U.S. Cl. .................................... 455/41.2; 455/41.3
(58) Field of Classification Search ............ 455/39, 455/41.1, 41.2, 41.3; 235/487, 492, 493, 235/435, 449, 451, 375; 340/10.1
See application file for complete search history.

(56) References Cited

U.S. PATENT DOCUMENTS

| 7,098,770 B2 | 8/2006 | Charrat et al. |
| 2005/0006469 A1 | 1/2005 | Nonneman et al. |
| 2006/0136902 A1 | 6/2006 | Monroe et al. |
| 2008/0155257 A1* | 6/2008 | Werner et al. ................ 713/168 |
| 2010/0227553 A1* | 9/2010 | Charrat et al. ............... 455/41.1 |

FOREIGN PATENT DOCUMENTS

| AU | 718196 B2 | 4/2000 |
| EP | 1 327 222 B1 | 7/2003 |

OTHER PUBLICATIONS

"Identification cards—Contactless integrated circuit(s) cards—Proximity cards", International Standard ISO/IEC 14443-2, First Edition (Jul. 1, 2001).
DIN, "Identification cards—Contactless integrated circuit(s) cards—Proximity cards", International Standard ISO/IEC WD 14443-2, (Jan. 26, 2007).
"Identification cards—Contactless integrated circuit(s) cards—Vicinity cards", International Standard ISO/IEC 15693-3, First Edition (Apr. 1, 2001).

* cited by examiner

*Primary Examiner* — Lewis West
(74) *Attorney, Agent, or Firm* — Panitch Schwarze Belisario & Nadel LLP

(57) ABSTRACT

A method for managing application data in an NFC system embedded or to be embedded in a portable object and including a contactless data sending/receiving interface, one or more host processors, and a data routing or transferring processor is described. The method includes generating internal application data in response to the occurrence of an internal event within the NFC system, and supplying the internal application data to a host processor of the NFC system.

18 Claims, 9 Drawing Sheets

METHOD AND DEVICE FOR MANAGING APPLICATION DATA IN AN NFC SYSTEM

CROSS-REFERENCE TO RELATED APPLICATIONS

This application is a Continuation of International Application No. PCT/FR2008/001351, filed Sep. 29, 2008, which was published in the French language on Jun. 25, 2009, under International Publication No. WO 2009/077664 A1 and the disclosure of which is incorporated herein by reference.

BACKGROUND OF THE INVENTION

Embodiments of the present invention relate to a method for managing application data in a Near Field Communication (NFC) system embedded or to be embedded in a portable object and including at least one contactless data sending/receiving interface, one or more host processors, and a data routing or transferring processor to perform routing or transferring of application data between the contactless data sending/receiving interface and the host processor(s). The NFC technology is currently developed by an industrial consortium gathered under the name of NFC Forum (http://www.nfc-forum.org). The NFC technology derives from the Radio Frequency Identification (RFID) technology and uses NFC components having several operating modes, in particular a Reader Mode and a Card Emulation Mode.

In reader mode, an NFC processor operates like a conventional RFID reader to read or write access an RFID chip (contactless chipcard or tag). The NFC processor emits a magnetic field, sends data to the RFID chip by modulating the amplitude of the magnetic field and receives data from the RFID chip by charge modulation and inductive coupling. This mode is also referred to as "active" mode, since in this mode the component emits a magnetic field.

In the emulation mode, described by European Patent Publication No. EP 1 327 222 in the name of the applicant, an NFC component operates in a passive manner like a transponder to dialog with another reader and be seen by the other reader as an RFID chip. The component does not emit any magnetic field, receives data by demodulating a magnetic field emitted by the other reader, and emits data to this other reader by modulating the impedance of the antenna circuit thereof (charge modulation). This mode is also referred to as "passive" mode, since in this mode the component does not emit any magnetic field.

Other communication modes may be implemented, in particular a device mode where an NFC component must match another component in the same operating mode, with each component alternately switching to a passive state (without emitting field) to receive data and to an active state (emitting field) to emit data.

In addition to these various operating modes, an NFC component may implement several contactless communication protocols, for example, ISO 14443-A, ISO 14443-B, ISO 15693, Felica, or the like. Each protocol defines a transmitting frequency of the magnetic field, a method for modulating the amplitude of the magnetic field to emit data in active mode, and a method of charge modulation by inductive coupling to emit data in passive mode. An NFC component may therefore be a multimode and multiprotocol device. The applicant, for example, commercializes an NFC component under the name "MicroRead".

Due to the wide communication abilities thereof, an NFC component is intended to be integrated into portable devices like mobile phones or Personal Digital Assistants (PDAs).

An NFC component of the type shown in FIG. 1, referenced as NFCS1, is thus meant to be manufactured. The system NFCS1 includes an NFC component referred to as NFCR1, and at least one first host processor HP1. Host processor refers to any integrated circuit including a microprocessor or a microcontroller and which is connected to a port of the NFC component. In numerous applications, the NFC system also includes a second host processor HP2, and sometimes a third host processor HP3.

The first host processor HP1 is the main processor of the device in which the NFC component is embedded. It is usually a processor for non secure applications, for example, the baseband (or radiotelephony) circuit of a mobile phone which controls various peripheral elements of the phone, like the keyboard, the display, the transmitter, the receiver, and the like. The second host processor HP2 may be a secure circuit, for example, the secure processor of a Subscriber Identification Module (SIM) card given by a mobile phone carrier and including a subscriber identifier. The third host processor HP3 may also be a secure circuit supplied by another service provider, for example, for secure payment applications. Such a processor also includes an identifier of the service user.

The resources of the NFC component are put at the disposal of the processors HP1, HP2, and HP3 to allow them to manage contactless applications. Example applications are illustrated in FIG. 2, which shows a mobile phone 30 equipped with the system NFCS1 of FIG. 1. The following applications may be distinguished:

1) Applications AP1 wherein the component NFCR1 of the mobile phone 30 is in reader mode to communicate in reading and/or writing with a contactless integrated circuit CLCT or a component NFCR1' in card emulation mode. The mobile phone is in this case used like an NFC reader. This type of application may be free and, for example, include reading advertizing data inserted into an advertising display of a bus shelter. The application may also be paid and include, for example, reading information reserved for subscribers. The program of the application AP1 may be held and executed by the processor HP1 if the service is free or held and executed by one of the processors HP2 or HP3 if the service is paid because it requires an identification of the subscriber or the user.

2) Secure applications AP2 wherein the component NFCR1 of the phone 30 is in card emulation mode to be read by a conventional reader RD or another component NFCR1', in applications of payment or paying access control (payment machine, metro entrance, or the like.). The mobile phone 30 is then used like a chip card. The program of the application AP2 is preferably held and executed by the secure processor HP2 or HP3, as shown in FIG. 1, because accessing the service requires an identification of the subscriber or user.

3) Non-secure applications AP2' wherein the component NFCR1 is also in card emulation mode to be read by conventional readers RD or another component NFCR1'. The mobile phone 30 is then also used as a chip card but the program of the application AP2' may be held and executed by the non secure processor HP1 or the processors HP2, HP3 (paid service providers may offer free applications).

4) Applications AP3 wherein the component NFCR1 of the mobile phone 30 is in device mode and dialogs with a component NFCR1' embedded in another mobile phone or a computer. This type of application is usually free and allows data packets to be transferred from one device to another (point-point file transfer in particular). The program of the application AP3 is preferably held and executed by the non secure processor HP1, as shown in FIG. 1, which has a greater computing power than that of the secure processor HP2 if it is a SIM card processor or greater than that of the secure processor HP3.

Thus, making an NFC system implies routing or at least transferring, within the NFC system, data emitted by the processors HP1, HP2, HP3 and which must be carried to the NFC component (outgoing data emitted via the contactless data transmission channel), and reciprocally routing or transferring data received by the NFC component and which must be carried to one of the processors HP1, HP2, HP3 (incoming data received via the contactless data transmission channel).

FIG. 3 schematically shows an example of architecture of the NFC component NFCR1 within the system NFCS1. The component NFCR1 includes a contactless data sending/receiving interface CLINT equipped with an antenna circuit ACT, wire communication interfaces INT1, INT2, INT3 linked to the interface CLINT, and a data routing or transferring processor NFCC1. The interface INT1 is connected to the host processor HP1, the interface INT2 connected to the host processor HP2 and the interface INT3 to the host processor HP3.

An external device EXTD is shown facing the component NFCR1. The external device may be a component NFCR1' or a conventional reader RD arranged in a computer, a payment terminal, a mobile phone, or the like, or a contactless chip CLCT and the antenna circuit thereof arranged on a support like a plastic or paper card, an electronic tag, or the like. When an NFC transaction starts between the system NFCS1 and the external device EXTD, the processor NFCC1 performs routing or transferring to a host processor HP1-HP3 application data read in or supplied by the external device EXTD, these data being received through the interface CLINT. The processor NFCC1 also performs routing or transferring data to the external device EXTD, via the interface CLINT, application data emitted by a host processor HP1-HP3.

US Patent Application Publication No. 2006/0136902 describes a mobile telephone including an RFID interface to capture data called "field data" and configured to then send information called "event tracking information" including the "field data" to a server, in order to manage a business method. The telephone also receives a state machine in the form of a compressed program, and decompresses this program to execute the functionalities of the state machine provided in relation with the business method steps.

In light of the state of the art, it may be desired to improve the process of the application data in an NFC system in order to improve the functionalities offered by the NFC systems to users.

As an example, some RFID chips (for example CLCT in FIG. 3) are equipped with a low cost and limited capacity memory and therefore only contain a small amount of information. There are, in particular, RFID chips containing only 48 bytes of data, so that the application data that can be read by an NFC system in this type of chip is reduced. The possibilities of exploitation or presentation of these data is therefore reduced by the host processor which receives and processes them within the NFC system.

Further, when data is exchanged between a host processor of the NFC system and an external device EXTD, there is generally no trace saved of the exchanges made if the host processor receiving or sending the data exchanged is not the main application processor of the NFC system, for example, the processor HP1 of FIG. 3. In practice, a direct connection may exist between the processor HP1 and one of the processors HP2, HP3, for example, a bus ISO 7816, which is not shown in FIG. 3, but service providers who control the functionalities of the host processors have limited the possibilities of exploiting this connection so that the possibilities of exchanging information between the processors are reduced. Thus a processor HP2 or HP3 may exchange application data with an external device via the interface CLINT without the processor HP1 being informed.

BRIEF SUMMARY OF THE INVENTION

An embodiment of the invention thus relates to a method for managing application data in an NFC system embedded or to be embedded in a portable object and including a contactless data sending/receiving interface, one or more host processors and a data routing or transferring processor to perform actions of routing or of transferring application data between the contactless data sending/receiving interface and the host processor(s). The method includes generating internal application data in response to the occurrence of an internal event within the NFC system; and supplying the internal application data to a host processor of the NFC system.

According to one embodiment, the internal application data is generated in a manner so as to form a command executable by the host processor to which the data is supplied.

According to one embodiment, the internal application data is generated in a predetermined format to simulate data that may be read in or supplied by an external component via a contactless communication channel.

According to one embodiment, the method further includes receiving a clock signal; generating an internal event from the clock signal; and in response to the occurrence of the internal event, supplying the internal application data to a host processor of the NFC system.

According to one embodiment, the method further includes configuring a first host processor of the NFC system to emit an internal request serving as an internal event; and in response to the emission of the request, supplying the internal application data to a second host processor of the NFC system.

According to one embodiment, the method further includes sending internal application data to an external server, by the host processor to which the internal application data was supplied.

According to one embodiment, the internal application data includes or forms a security key.

According to one embodiment, the internal application data simulates an RFID command.

According to one embodiment, the method further includes generating the internal application data using an encryption function.

An embodiment of the invention also relates to a device for managing application data integrated or to be integrated in a portable object, and provided to form with one or more host processors a communication system of NFC type embedded in the portable object. The device includes a contactless data sending/receiving interface of NFC type and a data routing or transferring processor to perform routing or transferring of application data between the contactless data sending/receiving interface and the host processor(s). The data routing or transferring processor is configured to generate, within the NFC system, internal application data in response to the occurrence of an internal event within the NFC system, and supply the internal application data to a host processor of the NFC system.

According to one embodiment, the data routing or transferring processor is configured to generate internal application data forming a command executable by the host processor to which the interal application data is supplied.

According to one embodiment, the data routing or transferring processor is configured to generate the internal application data in a determined format to simulate data that will be read in or supplied by an external component via a contactless communication channel.

According to one embodiment, the data routing or transferring processor is further configured to receive a clock signal, generate an internal event from the clock signal, and in response to the occurrence of the internal event, supply the internal application data to a host processor of the NFC system.

According to one embodiment, the data routing or transferring processor is further configured to receive an internal request serving as an internal event from a first host processor of the NFC system, and in response to the reception of the request, supply the internal application data to a second host processor of the NFC system.

According to one embodiment, the data routing or transferring processor is further configured to generate internal application data including or forming a security key.

According to one embodiment, the data routing or transferring processor is further configured to generate internal application data that simulates an RFID command.

According to one embodiment, the data routing or transferring processor is further configured to generate internal application data using an encryption function.

An embodiment of the invention also relates to an NFC system including a device for managing application data of the type described above and at least one host processor connected to the device.

An embodiment of the invention also relates to an electronic portable object, a mobile phone in particular, including an NFC system of the type described above.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Example embodiments of the invention will be described below in relation with, but not limited to the appended figures wherein in the drawings.

DETAILED DESCRIPTION OF THE INVENTION

Figure 4:
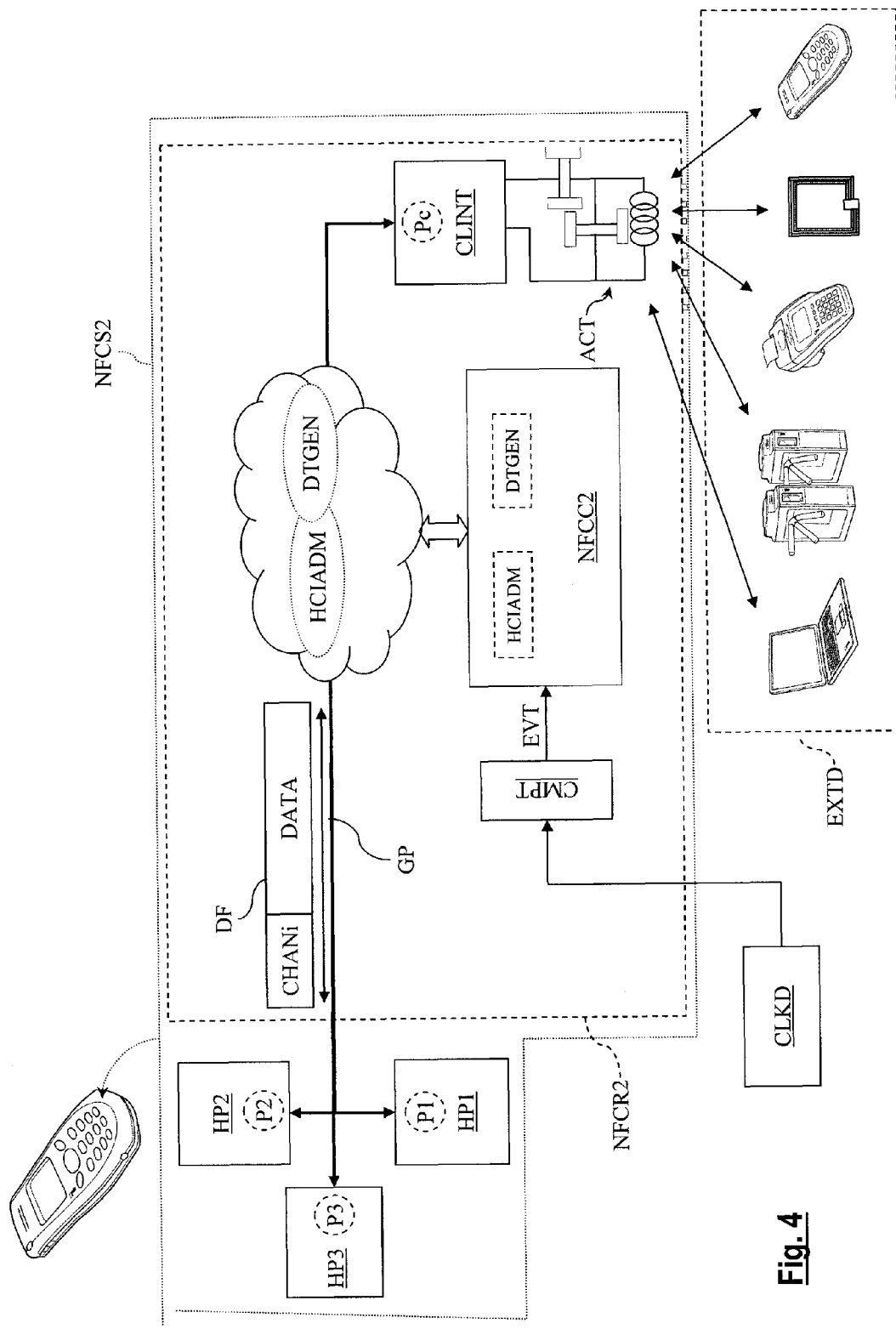
FIG. 4 schematically shows an NFC system wherein embodiments of the method for managing data according to the invention are implemented.

FIG. 4 schematically shows an NFC system referred to as NFCS2 wherein an embodiment of the method for managing data according to the invention is implemented. The architecture of the system NFCS2 shown here is only one example within which an embodiment of the invention is implemented. Still, as an example, it is considered here that the NFC system is integrated into a mobile phone, schematically shown in FIG. 4.

The system NFCS2 includes an NFC component referred to as NFCR2 and host processors HP1, HP2, HP3 or "application processors" because each is assumed to be able to perform NFC transactions or to take part in such transactions. The component NFCR2 includes a processor NFCC2 and a contactless data sending/receiving interface CLINT equipped with an antenna circuit ACT.

The host processor HP1 is here the main processor of the system NFCS2. The host processor HP1 is the radiotelephony processor (baseband processor) of the mobile phone. The host processor HP1 controls the radiotelephony circuit of the mobile phone and various peripheral elements of the phone, like a display screen, a keyboard, a receiver, a transmitter, and the like, which for simplicity are not shown. It is assumed here that the processor HP1 is able to connect to the Internet network via the radiotelephony circuit, or a possible WiFi or Bluetooth interface, this functionality being present in most of last generation mobile phones.

The host processor HP2 and the host processor HP3 are here secure circuits, for example, a SIM card and a bank card chip.

In this example, the component NFCR2 includes a routing element HCIADM ("Administrator HCI") implementing a routing protocol called "Host Controller Interface" (HCI). The routing element HCIADM creates data paths or routes channels to carry data within the NFC system. The routing element HCIADM is, for example, a software function executed by the processor NFCC2, which is thus used as data routing or transferring processor within the NFC system. The action of the routing element HCIADM on the transfer of data between the interface CLINT and the host processors HP1, HP2, HP3 or on the transfer of data between the processors HP1 to HP3 is schematically shown by a kind of "cloud" arranged on a global data path GP of the NFC system. This global data path is controlled by the element HCIADM and links the interface CLINT to the host processors HP1-HP3, and the host processors therebetween.

The element HCIADM creates a particular data path within the global data path by allotting thereto a routing channel number CHANi after a request for creating a data path has been emitted by an application processor, or after the interface CLINT establishing a link with an external device EXTD on request of the external device (the transactions may be initiated by the host processors or the external device). The protocol HCI implemented here uses data frames of the type {CHANi; DATA} including a header field including a routing channel number CHANi and a data field including application data DATA. In FIG. 4, source or destination points of a data flow in the NFC system are named P1 (point located in the host processor HP1), P2 (point located in the host processor HP2), P3 (point located in the host processor HP3) and Pc (point located in the contactless interface CLINT).

It will be noted that the way routing is performed as well as the NFC system architecture described here only constitute the implementation context of the embodiment of the method of the invention that will be described hereinafter. Embodiments of the method of the invention may also be implemented in an NFC system without data routing, for example, only including data exchange buffers to perform the internal transfer of data without generating routing channels and without using routing frames. Thus, hereinafter, the term "routing" may also refer to a simple data transfer from one point to another within the NFC system.

The interface CLINT may also be provided as an element being an integral part of the processor NFCC2 and completely under the control thereof, and not as a source or destination point Pc different from the processor NFCC2. In that case, the processor NFCC2 manages the contactless communication protocol. The interface CLINT only includes hardware elements for contactless communication and may not behave like a smart peripheral able to respond to or generate routing commands. If this option is retained, FIG. 4 and FIGS. 5, 6 described below are modified in order to represent the interface CLINT and the routing point Pc inside the block representing the processor NFCC2.

Examples of First and Second Embodiments

First and second embodiments of the method for managing data according to the invention are implemented by providing, in the component NFCR2, an element for generating complementary application data referred to as "DTGEN" in FIG. 4. Like the routing element HCIADM, the element DTGEN is, for example, a software function or "layer" which is executed by the processor NFCC2 and is based on the hardware interfaces of the processor. The element DTGEN and the element HCIADM may in addition form only one software entity, the difference between each element being made here essentially in order to distinguish the features of the invention from the conventional features of data routing or transferring.

Here "external application data" DATA1 refers to data that is transmitted or received via the contactless interface CLINT. In response to an action of routing external application data DATA1, complementary application data DATA2 is generated by the element DTGEN. The complementary data DATA2, if directed to the same destination point as the data DATA1, may be combined with the data DATA1. Such a combination may include an operation of concatenating or an operation of mixing complementary data DATA2 with application data DATA1, or both operations at the same time.

The result of the combination may be integrated into a same routing frame, of the type: {CHANi; DATA1, DATA2}. If the complementary data is directed to another destination point than the data DATA1, the data may be integrated into another routing frame, of the type: {CHANj; DATA2}, where the routing channel CHANj is different from the routing channel CHANi.

The complementary application data DATA2 is generally data which may be exploited by one of the application processors HP1, HP2, HP3 to execute a determined action, either in the form of parameters allowing the action to be executed to be completely defined, or in the form of at least one part of the instructions forming the action to be executed.

First Embodiment

According to the first embodiment of the invention, the complementary application data DATA2 is generated by the element DTGEN to enrich the application data DATA1 and is transmitted with the application data DATA1 to the element receiving the data DATA1. When the receiving element is an application processor of the NFC system, adding complementary data DATA2 to the initial data DATA1 allows the application processor to perform more complex actions than could have been performed upon simply receiving the data DATA1. That allows, for example, such actions to be performed from elementary data read in or supplied by low cost RFID chips or tags, the memory capacity of which is too low to store commands corresponding to these actions.

For example, when the data DATA1 is intended to the main processor HP1 as application processor and comprises raw information intended to be displayed on a screen of a device including the NFC communication system, here the screen of the mobile phone, like the words "Hello world", the complementary application data DATA2 may be "<b>" on the one hand and "</b>" on the other hand. The complementary data DATA2 is concatenated with the application data "Hello world" in order to form the following command:

<b>Hello world</b> which is coded HyperText Markup Language (HTML) and indicates that all the words between the tags <b> must be bold. Thus, upon receiving this instruction, the processor HP1 displays the words "Hello word" in bold characters.

The data display DATA1 may also be improved by adding complementary data DATA2 which causes the application processor to connect to an external server EXTSVR to receive display instructions therein. Like in the previous example, where the data DATA1 is "Hello world", the complementary data is, for example:

http://www.insidefr.com/parser.php?display= and is concatenated with the data DATA1 to form the following instruction:

http://www.insidefr.com/parser.php?display=Hello world

The command obtained is a redirection toward the website "insidefr.com" and a call to the function "parser.php" for the execution of the display function "display". The function parser.php, for example, sends a command to the processor HP1 so that it displays a menu or advertising, a background, or the like while "Hello world" is displayed. The processor HP1 may also receive from the web server display commands performing better quality screen display (font, color, text location, or the like).

Another example application is directed to the automatic download of a sound file only based on application data DATA1, for example, including a serial number. In that case, data DATA1 "call 61321" read in an RFID chip may be completed by the following complementary data DATA2:

"http://www.insidefr.com/parser.php?load=", to form a complete ring download instruction:

"http://www.insidefr.com/parser.php?load=61321".

Therefore the user does not need to call the number from which the download is to be performed. Thus, by reading elementary data in an RFID chip or tag, the method allows advanced commands which are executed by the application processor to be generated.

Yet another example application makes it possible to improve the display of information without necessarily passing through an external server. If, for example, the component NFCR2 keeps one or more images in memory, it is possible to display data DATA1 like a phone number "0487654321" in the form of an image rather than text and/or preceded by a provider logo. The complementary data DATA2 is, for example:

display ("logo.jpg")

and is concatenated with the data DATA1 to form the following display instruction, executed by the processor HP1:

display ("logo.jpg") 0487654321

It is also possible to complete the data DATA1 with advertizing information. If a menu data DATA1 "listen to your messages" is read in an RFID chip, news menu lines DATA2 may thus be added by the component NFCR2 such as "display your account", "access your WAP server", "call help", or the like.

Many other applications of this embodiment may be provided by those skilled in the art, according to the nature of complementary application data DATA2.

Second Embodiment

According to this embodiment, the complementary application data DATA2 is generated by the element DTGEN to the attention of a processor different from that to which the application data DATA1 is intended.

This embodiment of the invention particularly makes it possible for one processor to "spy" on another, like the programs called spywares. For this type of application, data exchanges between two elements of the NFC system give rise to the generation of complementary data DATA2 concerning these exchanges which can be exploited by another processor, preferably the main processor HP1, or an external server. That may, for example, allow user profiles to be managed. The elements to be spied are, for example, the secure host processor HP2 or HP3 and the communications established between external devices EXTD and these processors via the interface CLINT.

Thus, for example, when the element HCIADM carries to one processor HP2, HP3 data sent or read in the external device EXTD via the interface CLINT, the element DTGEN generates data DATA2 which may include information on transaction hour, information on the type of communication or transaction in progress (communication with a reader, a card, or the like), the content or identifier of a selected file, the nature and/or content of the data exchanged if they are not encrypted, as well as the identity of the processor HP2 or HP3 performing the communication or transaction. The complementary data DATA2 is then sent to the main processor HP1, which may send the complementary data DATA2 to an external server.

Generally, any information carried to a host processor or emitted by a host processor is susceptible of being forwarded to the processor HP1 via the processor HP1 to allow the processor HP1 to manage a user profile or allow a remote server to manage a user profile. Other aims may also justify the production of the "spy" data concerning the activity of the other processors HP1, HP2.

The data DATA2 may thus take a shape analog to "Insert database time, card, AID=10". A command registers in a database the hour of a transaction, the type of the transaction (here of card type) and an application identifier (AID) of the transaction. This database is internal to the phone. The command may also be sent by the routing element HCIADM to the processor HP1 so that it forwards it to an external application server to manage a user profile.

NDEF Formatting of the Complementary Application Data

In the embodiments described above, as well as in other embodiments described below, it may be advantageous that the complementary data is formatted according to a NDEF format. The NDEF format has been specifically designed for contactless data exchanges according to the NFC technology. More particularly, the NDEF format has been defined within the frame of the NFC Forum as a common data format for devices and chips compliant with the Forum specifications. This format therefore makes it possible to generate commands to which some elements of the communication system would not have access otherwise.

It is to be noted that the NDEF format has no connection with the HCI protocol for data internal routing within an NFC system. The NDEF format is a data format for data transmitted in a contactless communication channel and is assumed to be understood by any NFC element receiving these data. It is, for example, provided to encode all the data inserted into the RFID tags in the NDEF format.

Thus the data DATA2 in NDEF format can be encapsulated into a routing frame if a routing protocol is provided within the NFC system, or supplied without encapsulation to the application processor concerned if no routing protocol is provided.

In addition, the NDEF format also concerns external application data DATA1 (which is assumed to be read in this format when it is generalized) so that the result of the combination of the complementary data DATA2 and application data DATA1 (concatenation or mix) is also in the NDEF format.

To be clear, the command "http:\\www." in the NDEF format is written as follows:

D1 01 18 55 00 68 74 74 70 3A 5C 5C 77 77 77 2E

In this command, the values D1 01 18 55 00 form an NDEF header and the values 68 74 74 70 3A 5C 5C 77 77 77 2E form the text "http:\\www.".

Steps of executing the embodiments described above will now be described in reference to FIGS. 5 and 6.

Figure 5:
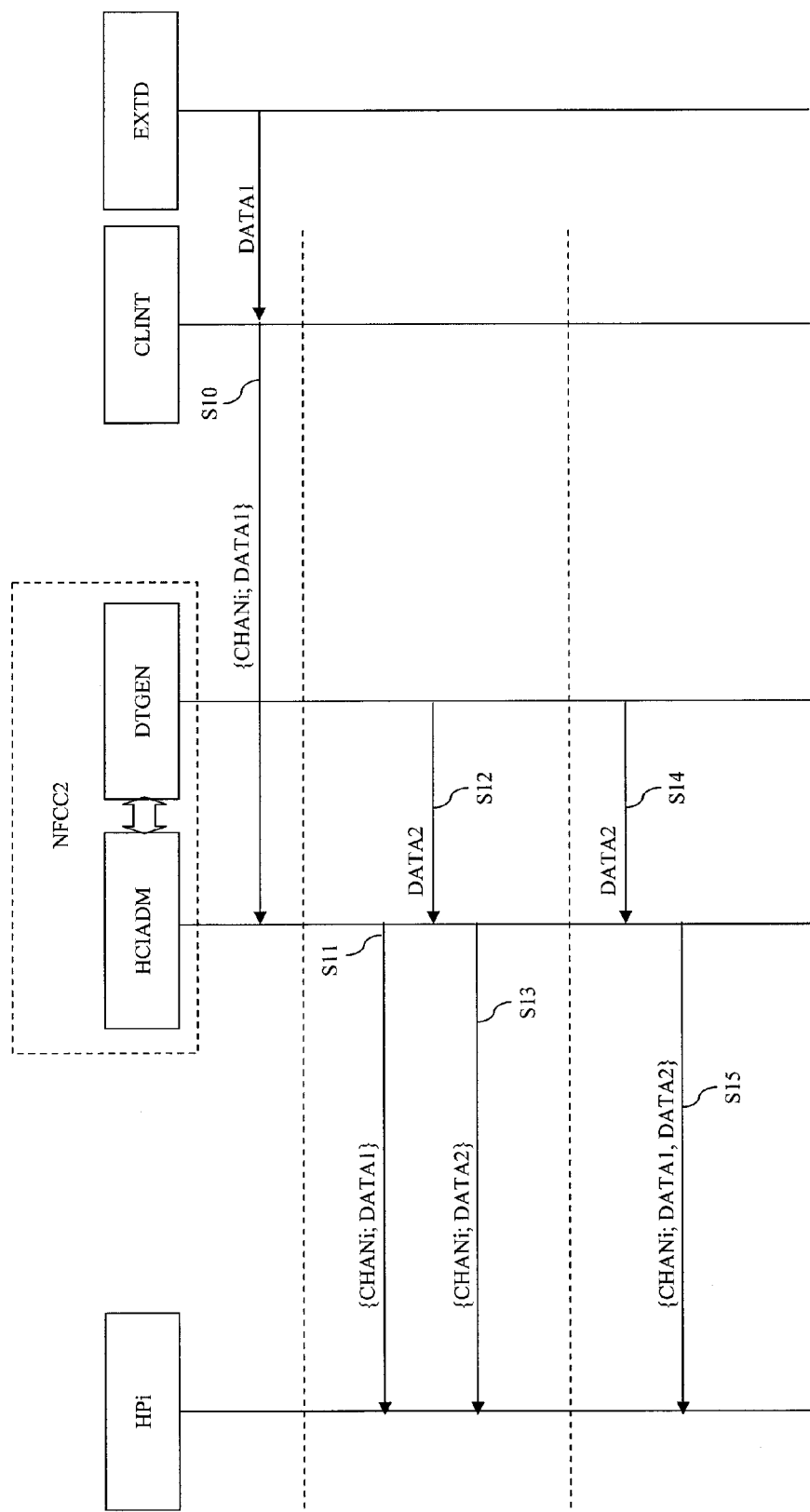
FIG. 5 shows a sequence of data exchange between elements of the NFC system of FIG. 4 and shows embodiments of the invention.

FIG. 5 shows a first example of a sequence for generating complementary application data.

During a step S10, application data DATA1 is received by the processor NFCC2 via the interface CLINT. The data DATA1 is supplied by or read in an external device EXTD (See FIG. 4). Steps of resetting the contactless communication, including exchanging RFID commands between the interface CLINT and the external device EXTD, are not shown for simplicity reasons. More particularly, the data DATA1 is received by the interface CLINT in a format proper to the contactless protocol used and are transmitted to the routing element HCIADM via a routing frame of the type {CHANi; DATA1} proper to the internal routing protocol used by the NFC system. It is to be noted again that the use of a routing frame between the interface CLINT and the processor NFCC2 is not required if the interface CLINT does not form an individualized routing point Pc and is included into the NFC processor as far as routing is concerned.

Step S10 triggers, according to two possible variations, steps S11, S12, S13 or steps S14 and S15.

Step S11 includes the routing element HCIADM supplying the data DATA1 to the element HPi identified by the channel number CHANi in the header of the frame.

During step S12, the element DTGEN generates complementary application data DATA2. To that end, the data DATA2 is, for example, read in a memory of the component NFCR2 to which the element DTGEN has access. The memory may include a look-up table between several different complementary data DATA2 and data DATA1 identification parameters. The parameters may be determined by the element DTGEN by analyzing the data DATA1 received. Thus, the data DATA2 may vary with the nature of data DATA1.

At step S13, the routing element HCIADM encapsulates the data DATA2 into a new routing frame and transmits this new routing frame to the element Hpi receiving the data DATA1 using the same routing channel CHANi. As suggested hereinbefore, the data DATA2 may be in the NDEF format.

In a variation, step S10 directly triggers step S14 which is identical to step S12 but is performed before transferring the data DATA1 to the processor HPi. The complementary data DATA2 is supplied to the routing element HCIADM, which combines the data DATA2 to the data DATA1 (concatenation or mixing), the whole may be in the NDEF format.

Then, during step S15, the routing element transmits the data frame now including the data DATA1 associated with the data DATA2, to the element HPi receiving the data DATA1.

Figure 6:
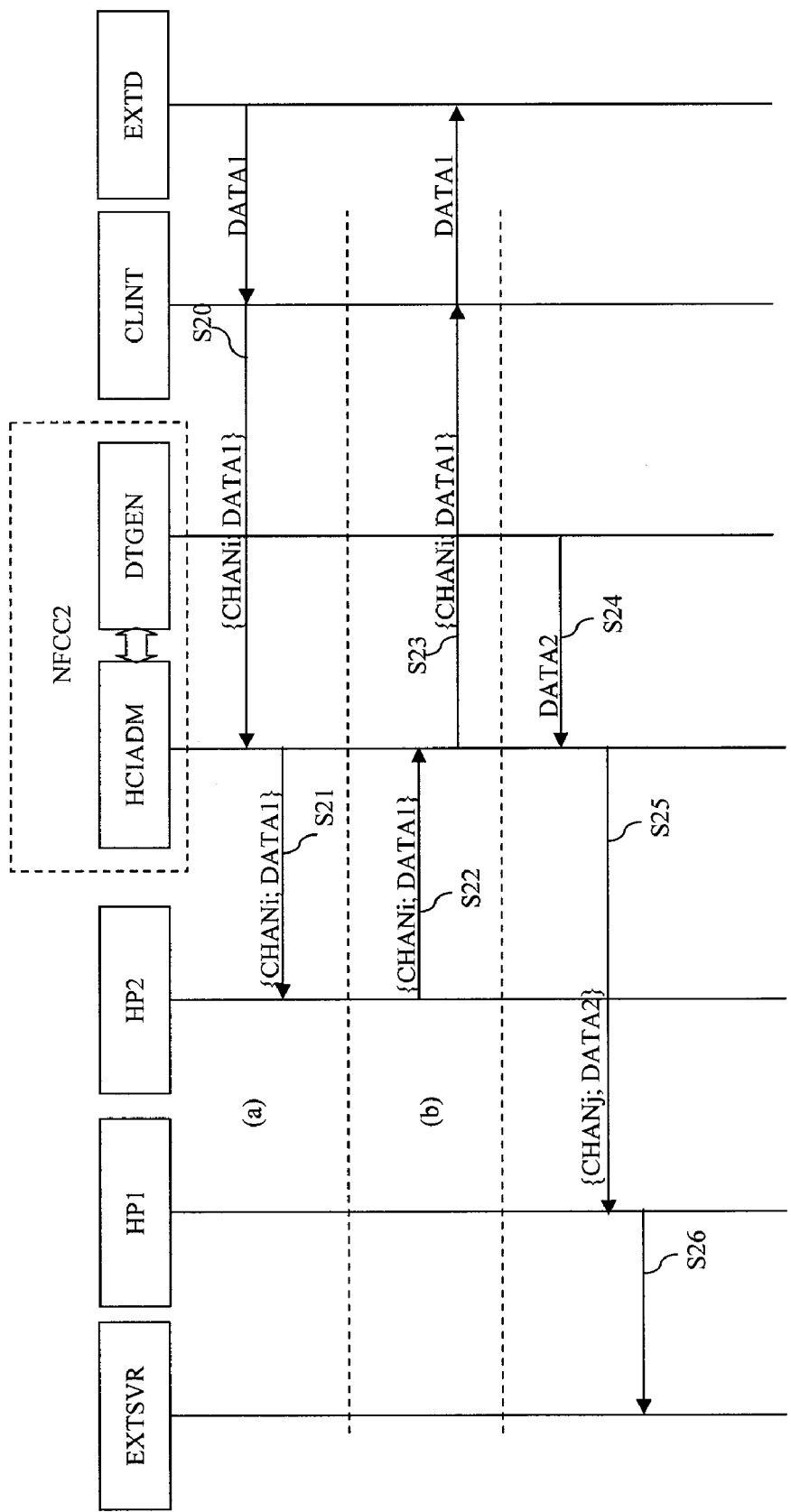
FIG. 6 shows a sequence of data exchange between elements of the NFC system of FIG. 4 and shows embodiments of the invention.

FIG. 6 shows a second example of sequence for generating complementary application data. In FIG. 6, application data DATA1 is exchanged via the interface CLINT between an external device EXTD and the host processor HP2.

According to a variation (a), the data DATA1 is read in the element EXTD via the interface CLINT or supplied by the device EXTD to the interface CLINT. The data DATA1 is then encapsulated into a frame of the type {CHANi; DATA1} which is first transferred to the routing element HCIADM during a step S20 and is then transferred from the routing element to the host processor HP2 during a step S21 using the same routing channel. As indicated previously, the action of routing between the interface CLINT and the element HCIADM may not exist if the interface CLINT is part of the processor NFCC2 and is not seen by it like an individualized routing point. Step S21 triggers steps S24, S25 and S26 described hereinafter.

According to a variation (b), data DATA1 is sent by the secure host processor HP2 to the external device EXTD via the interface CLINT. In this case, the data DATA1 is encapsulated into a frame of the type {CHANi; DATA1} and is carried to the element HCIADM during a step S22 and carried to the interface CLINT during a step S23 (if the latter is seen as an individualized routing point by the processor NFCC2). The data DATA1 is then sent to the device EXTD in a frame specific to the contactless communication protocol. Step S23 also triggers steps S24, S25 and S26.

During step S24, the element DTGEN generates complementary application data DATA2. As indicated above, the data DATA2 is, for example, spyware application data that may include information on transaction hour, a type of communication, the content or identifier of a selected file, the data read, the identity of the processor conducting the communication or transaction, or the like. The data DATA2 is supplied to the routing element HCIADM, possibly in the NDEF format, as previously explained.

At step S25, the routing element encapsulates the data DATA2 into a new routing frame of the type {CHANj; DATA1} having a number of routing channel different from "i" and transmits the frame to the application host processor HP1 to process and analyze the spy data. Possibly, during a step S26, the processor HP1 sends these spy data to an external server, the latter, for example, managing the user profile.

Third and Fourth Embodiment Examples

In third and fourth embodiments of the invention, application data DATA3 is generated by the element DTGEN in response to the occurrence of an internal event. The data DATA3 will be referred to as "internal application data" to distinguish from the complementary application data DATA2 emitted in relation with the exchange of data DATA1 with an external device. Like the complementary application data DATA2, the internal application data DATA3 may be exploited by one application processor HP1, HP2, HP3 to execute a determined action.

After being generated, the data DATA3 is transferred to one of the host processors. If a routing protocol HCI is implemented in the NFC system, as it has been assumed hereinbefore, the application data may then, as previously, be integrated into a routing frame of the type {CHANi; DATA3} to be sent by the routing element HCIADM to the element of the NFC system identified in the header CHANi.

In addition, the data DATA3 may be in the NDEF format so that the application processor "sees" the data DATA3 as if received via the contactless interface CLINT.

In the third embodiment, the internal event is independent of the host processors. It is, for example, the occurrence of a clock event EVT. In that case, the component NFCR2 is linked to a clock device CLKD or includes such a clock device (See FIGS. 4 and 8) and receives a clock signal CLK. The clock device CLKD is, for example, the quartz clock device of the mobile phone, external to the system NFCS2, which allows the phone to calculate the hour and date of the day. The clock signal CLK is, for example, a square or sinusoidal signal. To generate clock events, the component NFCC2 uses, for example, a counter CMPT (shown as being exterior to the processor NFCC2 in FIG. 4 for illustration) which generates the event EVT, for example, every "N" seconds after being activated.

In response to the occurrence of the event EVT, the component NFCR2 supplies data DATA3 to one of the application processors of the NFC system. The data DATA3 is preferably in the NDEF format or in a format comprehensible for the application processor (the NDEF format being here assumed to be the standard format of the application processors). The data DATA3 in the NDEF format is, for example, an encrypted signature, a clock value, or the like. Generally, the various examples of complementary data DATA2 or combination of data DATA1 and DATA2 described above may form internal application data DATA3.

In an example application, the component NFCR2 emits NDEF commands at instants determined by the clock device and/or at regular intervals according to the clock signal CLK. The clock event EVT is, for example, a recurrent event corresponding to a determined period of time elapsing, for example, 1 minute, 10 minutes, one hour, or the like. The component NFCR2 may also include a pseudo-random dynamic password generator able to generate a dynamic password upon occurrence of the event.

In the fourth embodiment, the internal event is generated by the host processor. It is, for example, the reception, by the processor NFCC2, of a request REQj (command or instruction) emitted by one of the host processors.

The component NFCR2, upon receiving the request REQj emitted by a host processor of the NFC system, for example, the host processor HP2, generates data DATA3 which simulates data read or supplied by an RFID chip or any other external device EXTD. The data DATA3 is transmitted to another host processor than that which has emitted the request, for example, the processor HP1. This embodiment allows, for example, the reading of an RFID chip upon request of one of the elements of the NFC system to be simulated. That is useful, for example, to transmit to the application processor HP1 data compliant with a set of commands (for example data in the NDEF format) to which the element sending the instructions, a SIM card in particular, has no access.

Figure 7:
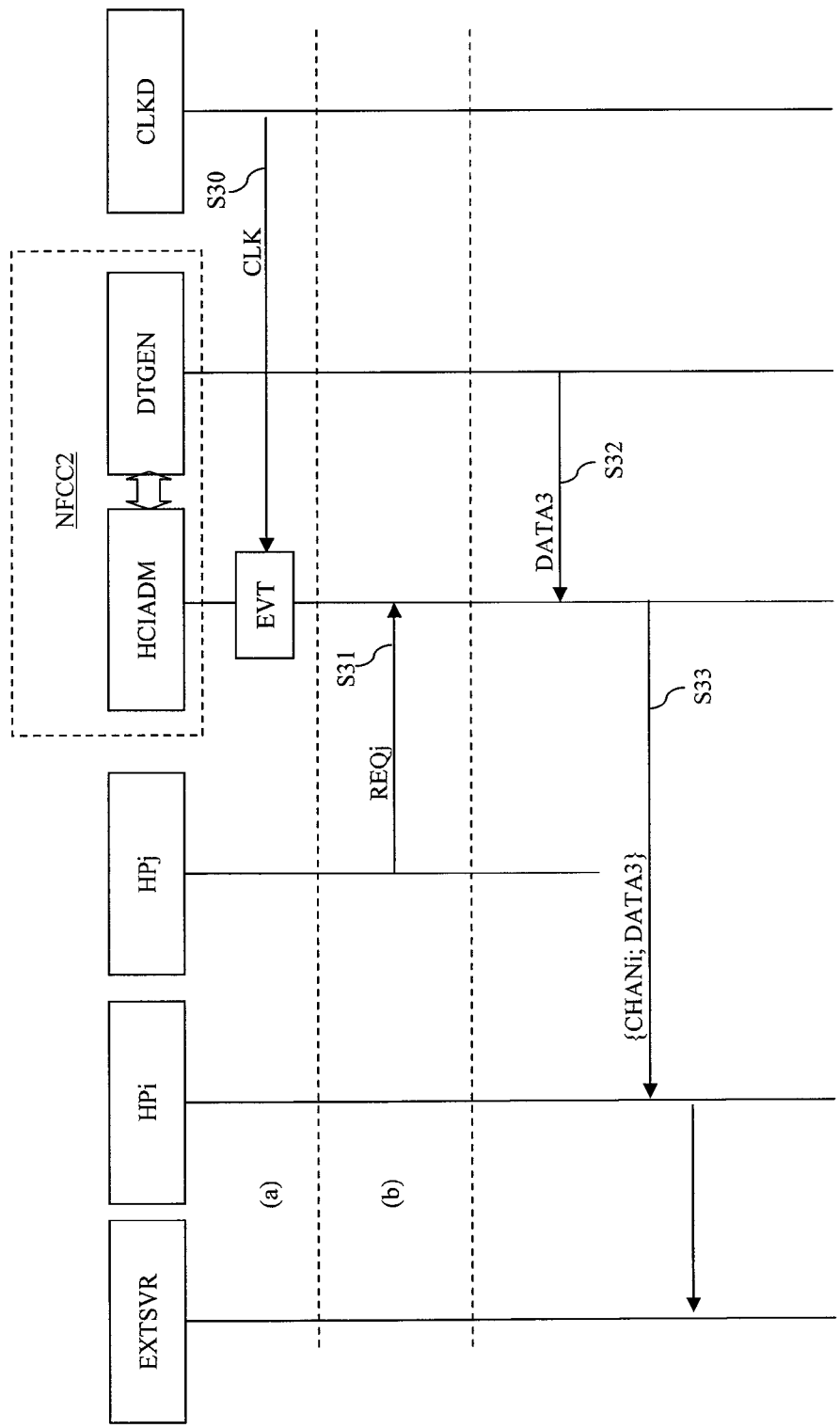
FIG. 7 shows a sequence of data exchange between elements of the NFC system of FIG. 4 and shows embodiments of the invention.

Steps showing examples of the implementation of the third and fourth embodiments are represented in FIG. 7.

According to a first variation (a), the processor NFCC2 receives the signal CLK of the clock device CLKD during a step S30 (the signal is continuously received but is simplified by step S30). The signal CLK triggers, at a given instant (for example every minute) the clock event EVT. The event EVT triggers steps S32 and S33 described hereinafter.

According to a second variation (b), the processor NFCC2 receives a request REQj from the host processor HPj (where j=1, 2 or 3) during a step S31. This request also triggers steps S32 and S33.

During step S32, the element DTGEN of the processor NFCC2 generates application data DATA3. As previously indicated, the data DATA3 may include a clock data (hour, date, or the like), a specific command (variation a) or a command and/or simulation of data read in or supplied by an external device EXTD (variation b).

At step S33, the processor NFCC2 transfers the data DATA3 to one of the host processors HPi (where i=1, 2 or 3). Here, the transfer is performed by the routing element HCIADM which encapsulates the data DATA3 in a routing frame of the type {CHANi; DATA3} and transmits the frame to the destination processor. In the variation (b), the destination point Pi identified by the channel number CHANi is different from the point Pj having emitted the request REQj.

As another application example, the clock event EVT triggers the element DTGEN sending to the host processor HP1 a security key generated by means of the encryption coprocessor AUTHCT (See FIG. 8) mentioned hereinbefore. The processor HP1 then transmits the key to an external server EXTSVR to which the user is connected. The key is, for example, renewed every minute and is transmitted every minute to the website. Without the key, the external server cuts the connection or refuses to execute the service.

It will be noted that the third or the fourth embodiments may be implemented without implementing the first or second embodiments of the invention, because the component NFCR2 may be configured to generate the internal application data DATA3 without being configured to generate the complementary application data DATA2 at the time of transferring or routing application data DATA1, and vice-versa.

Likewise, as it has already been indicated, the diverse embodiments previously described may be implemented independently of the implementation of a routing protocol within the NFC system, in particular the routing protocol which will now be described as an example, that is to say be implemented in the frame of a simple transfer of data within the NFC system, without routing protocol.

Example of Routing Protocol

For simplicity, it will be assumed hereinafter that the interface CLINT can send or receive data only according to three protocols PT1, PT2, PT3, for example, ISO 14443-A or "ISOA", ISO 14443-B or "ISOB" and ISO 15693 or "ISO15". The interface, for example, has three operating modes M1, M2, M3, i.e., reader mode, card emulation mode, and device mode. It is also assumed that the interface CLINT is configured like an individualized source or destination point for data routing.

The protocol HCI implemented here has the following global features:

(i) the provision of commands CMD allowing a data path (routing channel) to be managed, in particular commands for opening, closing and modifying data paths, the commands CMD including a header field and a routing data field including the features of the routing channel;

(ii) the use of data frames including a header field including a routing channel number CHANi and a data field including application data DATA.

The processor NFCC2 routes the data frames using a routing table which allows it to keep in memory the correspondence between each routing channel number CHANi and features of the corresponding routing channel.

The data paths stored in the routing table are differentiated from one another at least by the following parameters:

CHANi; IDsp, IDdp, Mi, PTi

CHANi being the routing channel number allotted to the data path; IDsp an identifier of the source point of the data path; IDdp an identifier of the destination point of the data path; and Mi and PTi being the operating mode and contactless communication protocol used by the interface CLINT to emit or send data via a contactless data transmission channel.

Each time the processor NFCC2 allots a routing channel number CHANi to a data path, it registers in the routing table RT the parameters IDsp, IDdp, Mi, PTi indicated in the command.

The commands for opening, closing or modifying a data path are emitted by one of the host processors HP1, HP2, HP3 or the interface CLINT and specify the operating mode Mi and the protocol PTi of the interface CLINT for the data path concerned. If the opening of a data path is requested by one of the host processors HP1, HP2 or HP3, the mode Mi and the protocol PTi indicated in the command are used to configure the interface CLINT regarding the contactless communication channel that the interface CLINT must create to emit the data which will be received via the data path. If opening a data path is requested by the interface CLINT, the operating mode Mi and protocol PTi specified in the command emitted by the interface CLINT are informative and specify the operating mode and protocol conditions in which the interface CLINT has received the data to be transmitted in the data path.

An example of a routing table created by the processor NFCC2 is described by Table 1 in Annex 1, which is an integral part of the description. This routing table is created after receiving a series of route opening commands having source points located in one of the processors HP1, HP2 or HP3 (i.e. a source point P1, P2 or P3). Optionally, the processor NFCC2 may define a secondary destination point intended to receive a copy of the data circulating in the data path. The secondary destination point or notification point is determined by the processor NFCC2 from a notification table (not shown in the figures) which indicates thereto the data paths for which the data must be notified to the other host processor. Although shown in a static way in Table 1, the routing table is dynamic and updated in real time according to the creation, modification or suppression commands received by the processor NFCC2.

In an embodiment, the routing table is static and has been prestored by the processor NFCC2, for example, upon request of one of the host processors and upon powering up the system. Table 2 in Annex 1 describes an example of a prestored routing table having as source points the points P1, P2 or P3 located in the host processors HP1, HP2, HP3. The channel number CHANi may also be prestored in the routing table for each conceivable routing configuration. In such a prestored table, a field "busy" and "open" or "authorized" is provided in each row of the table (a row corresponding to a routing channel). The processor NFCC2 registers the value "1" in the field "open" when it opens the corresponding data path, and registers the value "0" in response to a command for closing the data path. When a data path is used, the processor NFCC2 registers the value "1" in the field "busy".

The transmission of the data received in the data frames is also under the control of the processor NFCC2, which refers to the routing table to determine the destination points of the data. Here, the source point which sends the data to the processor does not need to specify all the parameters of the routing channel used: the header field of the routing frame simply includes the parametering bits T and L and 6 bits of channel number (allowing 63 data paths to be simultaneously routed, the channel "0" being reserved for HCI protocol administration).

Thus, upon receiving a routing frame, the processor NFCC2 sends the data to the destination point indicated in the routing table, using the channel number as an index to find this destination point in the routing table (and possibly the notification point). If the destination point is the point Pc (interface CLINT), the processor NFCC2 parameterizies the interface CLINT to send the data to a contactless data transmission channel compliant with the contactless protocol PTi and operating mode Mi information in the routing table. In an embodiment, the interface CLINT performs the parameterization thereof by reading the routing table when data are received in a routing frame.

Thus, the routing table allows the interface CLINT to be parameterized without necessarily including the operating mode Mi and contactless communication protocol PTi parameters into the headers of the data frames. Therefore the routing table is not a simple routing table in the conventional meaning of the term, but also forms a parameterization table.

Table 3 in Annex 1 describes an example of dynamic routing table including data paths created upon request of the interface CLINT (having Pc as source point). The routing table created here by the processor NFCC2 upon request of the interface CLINT indicates that the data must be sent to the three destination points P1, P2, P3 located in the host processors HP1, HP2, HP3, and the host processor which is not concerned by the data is in charge of not responding and letting the other host processor send response data to the interface CLINT.

The data paths created upon request of one of the host processors HP1, HP2, HP3 or upon request of the interface CLINT are preferably bidirectional. Thus, for example, once a data path has been created by a point P1 located in the processor HP1, to emit data in a contactless communication channel defined by the mode M2 and protocol PT2 parameter, all the data received by the interface CLINT in the mode M2 and according to the protocol PT2 will be sent in this data path and will therefore be received by the point P1. In addition, providing bidirectional data paths requires managing possible conflicts, by forbidding two bidirectional paths having different source and/or destination points to use the same mode Mi and protocol PTi parameters for the interface CLINT. For example, the routing table described in Table 1 shows data paths which may not coexist (for example channel 1 and channel 9, these data paths being described in the same table as an example only).

Example of Hardware and Software Architecture of the Component NFCR2

Figure 8:
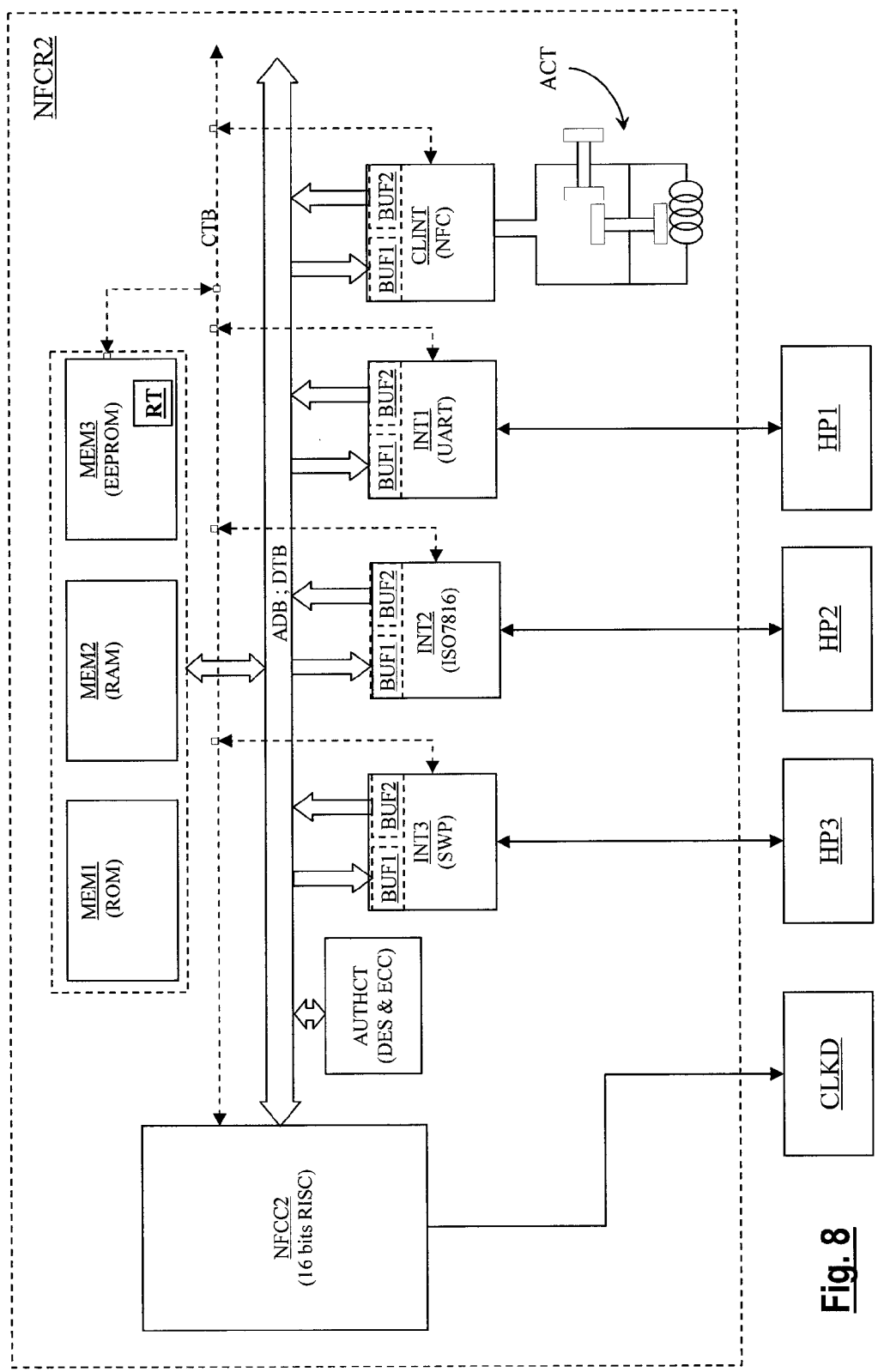
FIG. 8 shows an example of hardware architecture of an NFC component present in the NFC system of FIG. 4.

FIG. 8 shows an example of hardware architecture of the component NFCR2 of FIG. 4. The component includes:

(i) the processor NFCC2 and the interface CLINT already described, as well as the clock device CLKD (which remains optional if the second embodiment is not implemented);

(ii) a memory array including a program memory MEM1 of Read Only Memory (ROM) type, a data memory MEM2 of Random Access Memory (RAM) type, and an electrically erasable and programmable memory MEM3 of EEPROM type wherein the routing table RT is stored and the look-up table possibly used by the element DTGEN may also be stored;

(iii) an authentication and error correction circuit AUTHCT including algorithms Data Encryption Standard (DES) and Elliptic Curve Cryptography (ECC), or other encryption algorithms, (iv) a connection port INT1 of Universal Asynchronous Receiving Transmitting (UART) type, to which the host processor HP1 is here connected;

(v) a connection port INT2 of ISO7816 type to which the host processor HP2 is here connected (the processor HP2 being here assumed to be a SIM card);

(vi) a connection port INT3 of Single Wire Protocol (SWP) type allowing the host processor HP3 to be connected;

(vii) a data bus DTB and an address bus ADB linking the memory array, the processor NFCC2, the interface CLINT and the ports INT1, INT2, INT3; and (viii) a control bus CTB allowing the processor NFCC2 to control and read and/or write access these various elements.

It is to be noted that the buses ADB, DTB, CTB and the interfaces INT1 to INT3 together form what has been previously referred to as the global data path GP of the NFC system (FIG. 4).

The interface CLINT and the ports INT1, INT2, INT3 each include an input buffer BUF1 with parallel input and an output buffer BUF2 with parallel output write, read accessible, respectively, via the data bus and the address bus. The exchange of data forming the routing commands or data frames between the host processors HP1, HP2, HP3 and the processor NFCC2 or the interface CLINT is thus performed by data blocks the size of the buffers BUF1, BUF2, and is clocked by the processor NFCC2.

Figure 9:
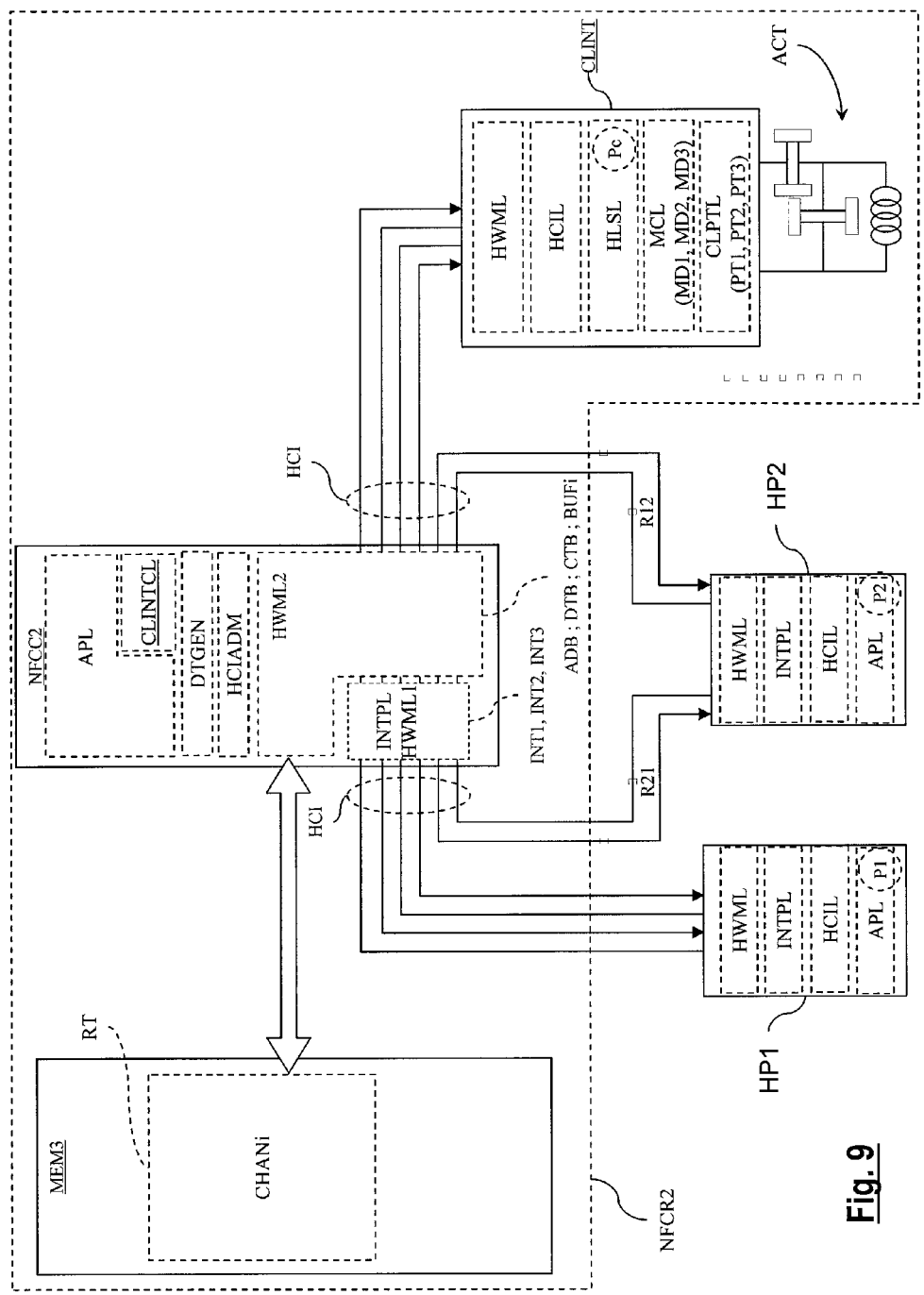
FIG. 9 shows an example of hardware architecture of the NFC component of FIG. 8.

FIG. 9 shows an example of software architecture of the component NFCR2 and the host processors HP1, HP2 (the host processor HP3 is not shown and assumed to have the same architecture as the host processor HP2). The software architecture includes, for the component NFCR2 and the host processors of the system, several software layers from the lowest level (data link layer) to the highest level (application layer). FIG. 9 simplifies the representation of these software layers in relation to the real software architecture of an NFC system, but it is sufficient for those skilled in the art who may want to implement the invention in the way suggested here.

Each host processor HP1, HP2 includes at least four software layers, by ascending order:

(i) A lowest level Hardware Management Layer (HWML) manages the operation of hardware elements allowing the host processors to exchange data with the processor NFCC2. It is, for example, the UART interface management layer for the processor HP1 and the ISO7816 interface management layer for the processor HP2.

(ii) An Interface Protocol Layer (INTPL) manages the protocol of the communication ports INT1, INT2. It is, for example, the UART protocol management layer for the processor HP1 and the ISO7816 protocol management layer for the processor HP2.

(iii) An HCIL HCIL which manages the HCI protocol previously described, i.e., which manages the creation of a communication channel by generating the routing commands and processing the response messages to such commands. This layer is based on the layers INTPL and HWML which are nearly transparent thereto.

Figure 1:
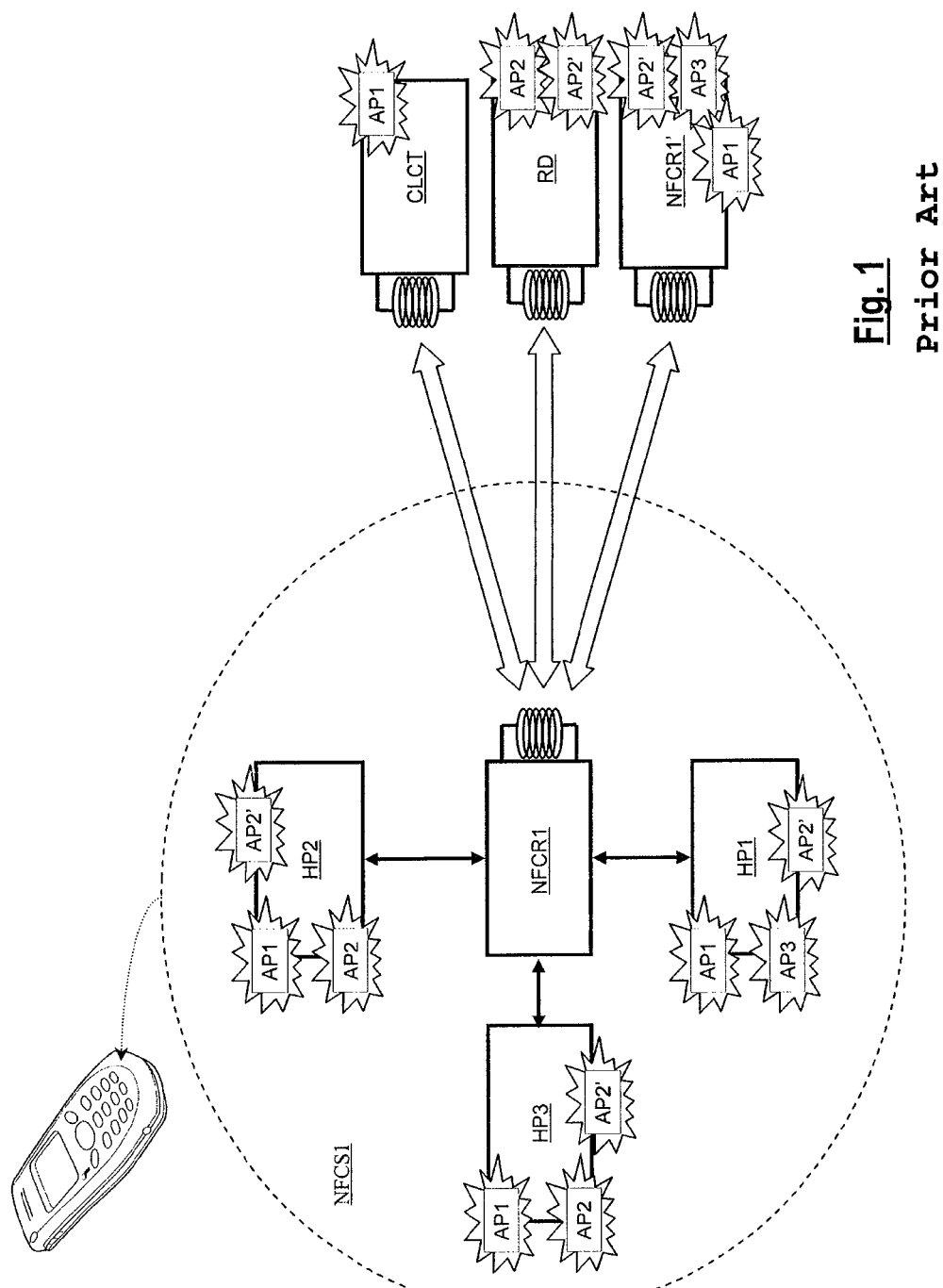
FIG. 1 shows in block form a conventional architecture of NFC system, and external elements with which the NFC system can dialog.
Figure 2:
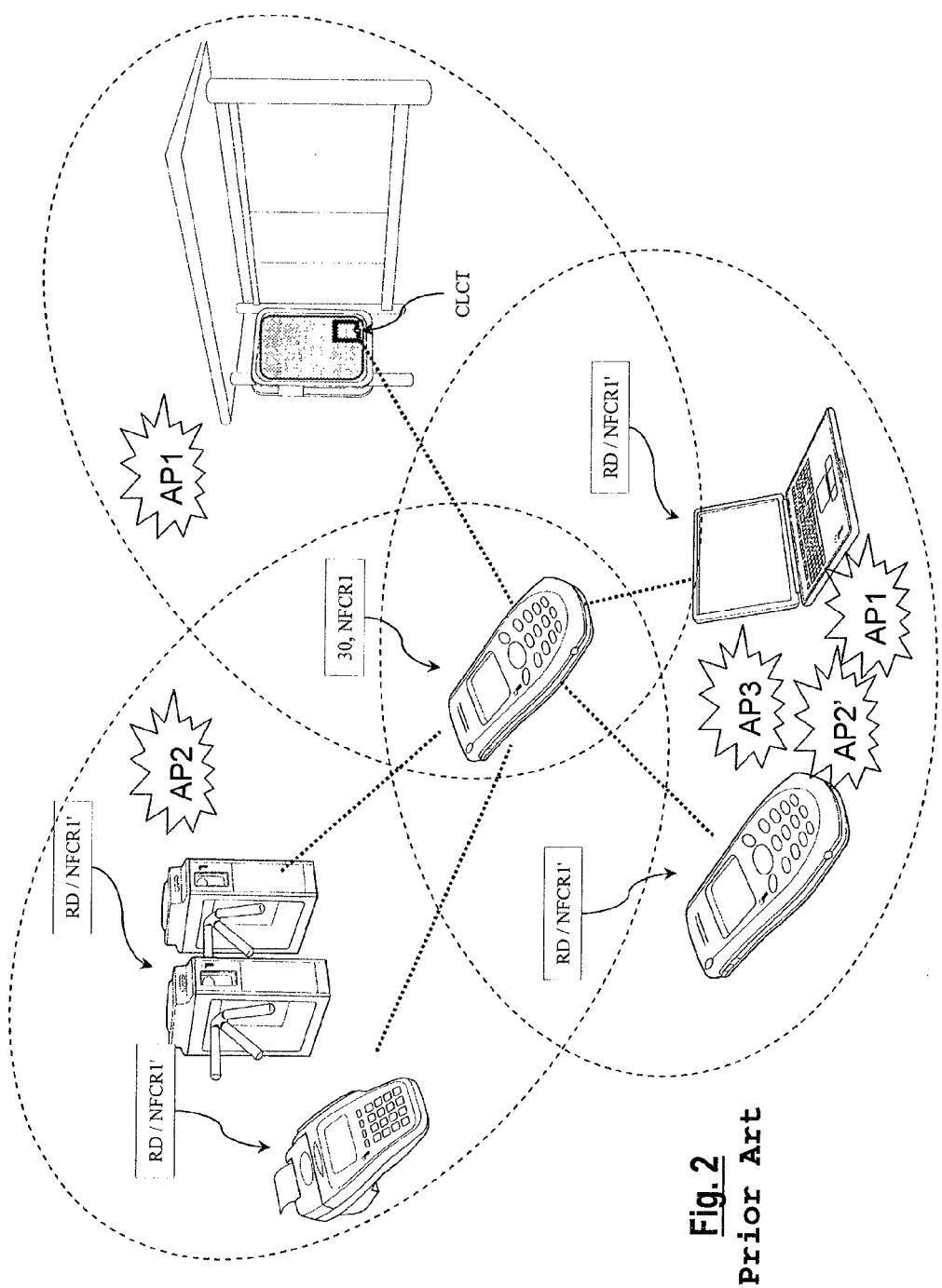
FIG. 2 shows various applications of an NFC system integrated into a mobile phone.
Figure 3:
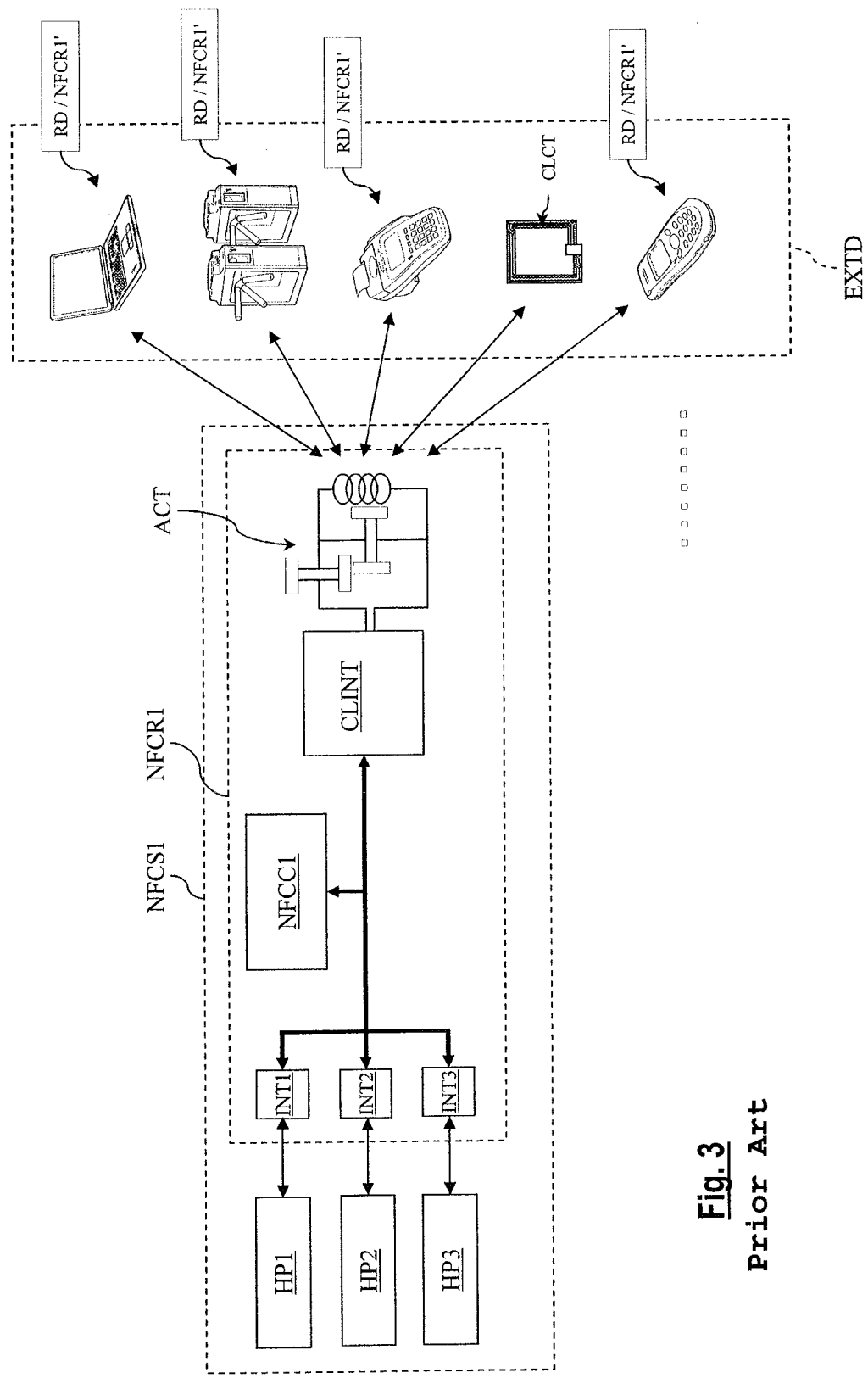
FIG. 3 shows in block form the conventional architecture of an NFC component present in the NFC system of FIG. 1

An Application Layer (APL) of high level manages the RFID applications like those shown in FIGS. 2 and 4 (reading of a chipcard or an electronic tag, emulation of a chipcard, dialog in device mode with an external processor to exchange files, or the like.). This layer may include several application programs, each being secured or not (according to the internal resources of the processor) and each using one type of protocol PTi and one operating mode Mi of the interface CLINT. Thus, this high level layer is based on the layers INTPL and HWML and the layer HCIL, which are nearly transparent thereto. The speed of the data transfer through the data paths created thanks to the layer HCIL advantageously causes a substantial increase in the performance of the application layer APL.

The source or destination points P1, P2 and P3 located in the host processors may be "services" (determined applications). The services may request the processor NFCC2, each independently of the other, to create data paths to simultaneously use the interface CLINT (provided there is no collision of modes and protocols, as mentioned hereinbefore). Thus, the software architecture allows a service to be implemented as source or destination point of a data path, and allows several data paths to be simultaneously created between two entities, for example, between two host processors or between a host processor and the contactless data sending/receiving interface.

Substantially similarly, the processor NFCC2 includes the following software layers:

(i) Two layers HWML1 and INTPL of the same type as the layers HWML and INTPL present in the host processors. To simplify the Fig., these layers are shown in the processor NFCC2 but are actually located in the ports INT1 and INT2, which are assumed to be part of the processor NFCC2, as well as the buses ADB, DTB, CTB. Indeed, processing the UART and 7816 protocols is here performed in the ports INT1, INT2, which put their input and output buffers BUF1, BUF2 at the disposal of the processor NFCC2 via the buses ADB, DTB, CTB.

(ii) Another low level layer HWML2 allows the processor NFCC2 to write the buffers BUF1 and read the buffers BUF2, via the buses ADB, DTB, CTB, by cutting the data frames or commands into data blocks the same size as the buffers.

(iii) A layer HCIADM or protocol administration layer HCI dialogs with the layers HCIL of the host processors HP1, HP2 as routing administrator and forms the element HCIADM previously described. Thus this layer executes the tasks of data paths allocation described above, and accesses the routing table RT in reading and writing via the low level layer HWML2.

(iv) A layer DTGEN forms the element generating complementary application data DATA2 or internal application data DATA3, which interacts with the layer HCIADM to implement one of the two embodiments of the invention; as indicated hereinbefore the layers HCIADM and DTGEN may also be mixed into one software entity.

(v) A Contactless Interface Control Layer (CLINTCL) manages the interface CLINT and indicates thereto the mode Mi in which it must switch and the protocol PTi to be used to emit data in a contactless communication channel. To that end, the layer CLINTCL exploits the parameters PTi and Mi present in the routing table. More particularly, the layer HCIADM writes the parameters in the routing table in response to commands for opening data paths, while the layer CLINTCL searches for the parameters in the table using as index the channel number of the data frames sent by the host processors HP1, HP2. This layer also controls the interface CLINT in contactless data reception mode and cyclically requests the interface CLINT to perform scanning the modes (reader mode, emulation mode, device mode, or the like) and, in each mode, to search for the incoming data. That means that the interface CLINT emits at regular intervals a magnetic field to interrogate possible contactless cards or tags (or other contactless portable objects) which may be present in the interrogation field thereof. The interface CLINT also switches at regular intervals to a listening mode (emulation mode) to detect if a reader in active mode sends interrogation messages.

(vi) An optional layer APL may manage applications, like the host processors. In that case, data communication between the processor NFCC2 and the interface CLINT may be performed via the communication channel HCI, if the interface CLINT is equipped with the layer INTPL, which is the case in the embodiment shown in FIG. 9. This layer accesses the look-up table in reading and writing via the low level layer HWML2.

Eventually, the interface CLINT includes the following software layers:

(i) On the side of the processor NFCC2, a low level layer HWML, equivalent to the layer HWML2 of the processor NFCC2, manages the data buffers BUF1, BUF2 via the buses ADB, DTB, CTB.

A layer HCIL (as indicated above) renders the interface CLINT compliant with the protocol HCI.

On the side of the antenna circuit ACT, a Contactless Protocol Layer (CLPTL) and a Mode Control Layer (MCL) perform controlling or processing the electrical signals applied to the antenna circuit ACT or received by it, to implement the operating modes M1, M2, M3 and the protocols PT1, PT2, PT3.

Between the layers located on the side of the processor NFCC2 and the layers located on the side of the antenna circuit, a central high level High Level Service Layer (HLSL) makes it possible to define in the interface CLINT several source or destination points Pc to create several data paths with multiple points P1, P2, P3 in the application layers APL of the host processors HP1, HP2, HP3. Admittedly, this high level architecture is optional and multiple points Pc virtually located in the interface CLINT may be managed by the processor NFCC2.

It will be clear to those skilled in the art that the present invention is susceptible of various other embodiments. Thus the invention is not limited to a system including several host processors. The invention also covers the control of the execution of applications in a system having one host processor and executing several applications brought to communicate between them.

It is to be noted that in the near future the host processors will be totally virtual and integrated into the component NFCR2, which will then be able to take the shape of a multiple processor integrated circuit.

In addition, although the embodiments of the invention previously described relate to a mobile phone wherein the processors HP2, HP3 are generally secured, applications of the invention may be based on using a host processor HP2 or even two host processors HP2, HP3 which are not secured, if these applications do not require a high security level. Conversely, the host processor HP1 hereinbefore considered as the main processor of the NFC system in that it controls the essential peripheral elements like a display device or radiotelephony means, may be a secure processor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Annex 1, Integral Part of the Description—Examples of Routing Tables

TABLE 1

Example of dynamic routing table with source points located in HP1 or HP2

| CHANi | IDsp | PTi | Mi | Send IDdp | Notify | Comments |
|---|---|---|---|---|---|---|
| 1 | ID(P1) | PT1 | M1 | ID(Pc) | ID(P2) | Processor HP1 to interface CLINT in reader mode ISOA |
| 2 | ID(P1) | PT2 | M1 | ID(Pc) | — | Processor HP1 to interface CLINT in reader mode ISOB |
| 3 | ID(P1) | PT3 | M1 | ID(Pc) | — | Processor HP1 to interface CLINT in reader mode ISO15 |
| 4 | ID(P1) | PT1 | M3 | ID(Pc) | ID(P2) | Processor HP1 to interface CLINT in device mode ISOA |
| 5 | ID(P1) | PT2 | M3 | ID(Pc) | — | Processor HP1 to interface CLINT in device mode ISOA |
| 6 | ID(P1) | PT3 | M3 | ID(Pc) | — | Processor HP1 to interface CLINT in device mode ISO15 |
| 7 | ID(P1) | — | — | ID(P2) | | Processor HP1 to SIM card (HP2) |
| 8 | ID(P2) | — | — | ID(P1) | — | SIM card (HP2) to processor HP1 |
| 9 | ID(P2) | PT1 | M1 | ID(Pc) | — | SIM card (HP2) to interface CLINT in reader mode ISOA |
| 10 | ID(P2) | PT2 | M1 | ID(Pc) | ID(P2) | SIM card (HP2) to interface CLINT in reader mode ISOB |
| 11 | ID(P2) | PT3 | M1 | ID(Pc) | ID(P2) | SIM card (HP2) to interface CLINT in reader mode ISO15 |
| 12 | ID(P2) | PT1 | M3 | ID(Pc) | — | SIM card (HP2) to interface CLINT in device mode ISOA |
| 13 | ID(P2) | PT2 | M3 | ID(Pc) | ID(P2) | SIM card (HP2) to interface CLINT in device mode ISOB |
| 14 | ID(P2) | PT3 | M3 | ID(Pc) | ID(P2) | SIM card (HP2) to interface CLINT in device mode ISO15 |

TABLE 2

Example of prestored routing table with source points located in HP1 or HP2

| CHANi | IDsp | PTi | Mi | Send IDdp | Notify | Open | Busy | Comments |
|---|---|---|---|---|---|---|---|---|
| 1 | ID(P1) | PT1 | M1 | ID(Pc) | ID(P2) | | 1 | Processor HP1 to interface CLINT in reader mode ISOA |
| 2 | ID(P1) | PT2 | M1 | ID(Pc) | — | | 0 | Processor HP1 to interface CLINT in reader mode ISOB |
| 3 | ID(P1) | PT3 | M1 | ID(Pc) | — | | 0 | Processor HP1 to interface CLINT in reader mode ISO15 |
| 4 | ID(P1) | PT1 | M3 | ID(Pc) | ID(P2) | | 0 | Processor HP1 to interface CLINT in device mode ISOA |
| 5 | ID(P1) | PT2 | M3 | ID(Pc) | — | | 0 | Processor HP1 to interface CLINT in device mode ISOB |
| 6 | ID(P1) | PT3 | M3 | ID(Pc) | — | | 0 | Processor HP1 to interface CLINT in device mode ISO15 |
| 7 | ID(P1) | — | — | ID(Pc) | | | 1 | Processor HP1 to SIM card (HP2) |
| 8 | ID(P2) | — | — | ID(P1) | — | | 0 | SIM card (HP2) to processor HP1 |
| 9 | ID(P2) | PT1 | M1 | ID(Pc) | — | | 0 | SIM card (HP2) to interface CLINT in reader mode ISOA |
| 10 | ID(P2) | PT2 | M1 | ID(Pc) | ID(P2) | | 0 | SIM card (HP2) to interface CLINT in reader mode ISOB |
| 11 | ID(P2) | PT3 | M1 | ID(Pc) | ID(P2) | | 0 | SIM card (HP2) to interface CLINT in reader mode ISO15 |
| 12 | ID(P2) | PT1 | M3 | ID(Pc) | — | | 1 | SIM card (HP2) to interface CLINT in device mode ISOA |
| 13 | ID(P2) | PT2 | M3 | ID(Pc) | ID(P2) | | 0 | SIM card (HP2) to interface CLINT in device mode ISOB |
| 14 | ID(P2) | PT3 | M3 | ID(Pc) | ID(P2) | | 0 | SIM card (HP2) to interface CLINT in device mode ISO15 |

TABLE 3

Example of dynamic routing table with a source point located in the interface CLINT and sending all the data received to the host processors HP1, HP2

| CHANi | IDsp | PTi | Mi | IDdp | | Comments |
|---|---|---|---|---|---|---|
| 40 | ID(Pc) | PT1 | M1 | ID(P1) | ID(P2) | Interface CLINT in reader mode ISOA to processors HP1, HP2 |
| 41 | ID(Pc) | PT2 | M1 | ID(P1) | ID(P2) | Interface CLINT in reader mode ISOB to processors HP1, HP2 |
| 42 | ID(Pc) | PT3 | M1 | ID(P1) | ID(P2) | Interface CLINT in reader mode ISO 15693 to processors HP1, HP2 |
| 43 | ID(Pc) | PT1 | M2 | ID(P2) | ID(P2) | Interface CLINT in emulation mode ISO A to processors HP1, HP2 |
| 44 | ID(Pc) | PT2 | M2 | ID(P1) | ID(P2) | Interface CLINT in emulation mode ISO B to processors HP1, HP2 |
| 45 | ID(Pc) | PT3 | M2 | ID(P1) | ID(P2) | Interface CLINT in emulation mode ISO 15693 to processors HP1, HP2 |
| 46 | ID(Pc) | PT1 | M3 | ID(P1) | ID(P2) | Interface CLINT in device mode ISO A to processors HP1, HP2 |
| 47 | ID(Pc) | PT2 | M3 | ID(P1) | ID(P2) | Interface CLINT in device mode ISO B to processors HP1, HP2 |
| 48 | ID(Pc) | PT3 | M3 | ID(P1) | ID(P2) | Interface CLINT in device mode ISO 15693 to processors HP1, HP2 |

I claim:

1. A method for managing application data in an NFC system embedded or to be embedded in a portable object and including a contactless data sending/receiving interface, one or more host processors, and a data routing or transferring processor to perform actions of routing or transferring of application data between the contactless data sending/receiving interface and the one or more host processors, the method comprising:
generating internal application data in response to an occurrence of an internal event within the NFC system, wherein the internal application data is generated in a predetermined format to simulate data read in or supplied by an external component via a contactless communication channel; and
supplying the internal application data to one of the one or more host processors of the NFC system.

2. The method according to claim 1, wherein the internal application data is generated to form a command executable by the host processor to which the internal application data is supplied.

3. The method according to claim 1, further comprising:
receiving a clock signal;
generating an internal event from the clock signal; and
in response to the occurrence of the internal event, supplying the internal application data to one of the one or more host processors of the NFC system.

4. The method according to claim 1, further comprising:
configuring a first host processor of the NFC system to emit an internal request serving as an internal event; and
in response to the emission of the request, supplying the internal application data to a second host processor of the NFC system.

5. The method according to claim 1, further comprising sending the internal application data to an external server, by the host processor to which the internal application data was supplied.

6. The method according to claim 1, wherein the internal application data includes or forms a security key.

7. The method according to claim 1, wherein the internal application data simulates an RFID command.

8. The method according to claim 1, further comprising generating the internal application data using an encryption function.

9. A device for managing application data integrated or to be integrated in a portable object, and provided to form with one or more host processors a communication system of Near Field Communication (NFC) type embedded in the portable object, the device comprising:
a contactless data sending/receiving interface of NFC type; and
a data routing or transferring processor to perform routing or transferring of application data between the contactless data sending/receiving interface and the one or more host processors, the data routing or transferring processor being configured to:
(a) generate, within the NFC system, internal application data in response to an occurrence of an internal event within the NFC system, and
(b) supply the internal application data to one of the one or more host processors of the NFC system,
wherein the data routing or transferring processor is further configured to generate the internal application data in a predetermined format to simulate data read in or supplied by an external component via a contactless communication channel.

10. The device according to claim 9, wherein the data routing or transferring processor is further configured to generate internal application data forming a command executable by the host processor to which the internal application data is supplied.

11. The device according to claim 9, wherein the data routing or transferring processor is further configured to:
(c) receive a clock signal,
(d) generate an internal event from the clock signal, and
(e) in response to the occurrence of the internal event, supply the internal application data to one of the one or more host processors of the NFC system.

12. The device according to claim 9, wherein the data routing or transferring processor is further configured to:
(c) receive an internal request serving as an internal event from a first host processor of the NFC system, and
(d) in response to the reception of the request, supply the internal application data to a second host processor of the NFC system.

13. The device according to claim 9, wherein the data routing or transferring processor is further configured to generate internal application data including or forming a security key.

14. The device according to claim 9, wherein the data routing or transferring processor is further configured to generate internal application data that simulates an RFID command.

15. The device according to claim 9, wherein the data routing or transferring processor is further configured to generate internal application data using an encryption function.

16. An NFC system comprising a device for managing application data according to claim 9 and at least one host processor connected to the device.

17. An electronic portable object comprising an NFC system according to claim 16.

18. A method for managing application data in an NFC system embedded or to be embedded in a portable object and including a contactless data sending/receiving interface, one or more host processors, and a data routing or transferring processor to perform actions of routing or transferring of application data between the contactless data sending/receiving interface and the one or more host processors, the method comprising:
generating internal application data in response to an occurrence of an internal event within the NFC system; and
supplying the internal application data to one of the one or more host processors of the NFC system,
wherein the internal application data is generated to form a command executable by the host processor to which the internal application data is supplied.

* * * * *